(12) United States Patent
Okumura et al.

(10) Patent No.: US 10,534,432 B2
(45) Date of Patent: Jan. 14, 2020

(54) CONTROL APPARATUS

(71) Applicant: Sony Interactive Entertainment Inc., Tokyo (JP)

(72) Inventors: Yasushi Okumura, Tokyo (JP); Shinichi Hirata, Kanagawa (JP); Yoshihisa Takahashi, Saitama (JP); Yoichi Nishimaki, Kanagawa (JP); Norihiro Nagai, Kanagawa (JP); Kunihito Sawai, Kanagawa (JP); Yuichi Machida, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/075,267

(22) PCT Filed: Feb. 9, 2017

(86) PCT No.: PCT/JP2017/004764
§ 371 (c)(1),
(2) Date: Aug. 3, 2018

(87) PCT Pub. No.: WO2017/150129
PCT Pub. Date: Sep. 8, 2017

(65) Prior Publication Data
US 2019/0025916 A1    Jan. 24, 2019

(30) Foreign Application Priority Data

Mar. 4, 2016    (JP) .................................. 2016-042411

(51) Int. Cl.
*G06F 3/01* (2006.01)
*A63F 13/54* (2014.01)
(Continued)

(52) U.S. Cl.
CPC ............ *G06F 3/014* (2013.01); *A63F 13/215* (2014.09); *A63F 13/218* (2014.09); *A63F 13/24* (2014.09);
(Continued)

(58) Field of Classification Search
CPC . G06F 3/014; G06F 3/01; G06F 3/016; G06F 3/017; G06F 3/16; G06T 13/40;
(Continued)

(56) References Cited

U.S. PATENT DOCUMENTS 6,704,694 B1    3/2004  Basdogan
8,323,106 B2   12/2012  Zalewski
(Continued)

FOREIGN PATENT DOCUMENTS

EP    2323022 A2    5/2011
EP    2796965 A2   10/2014
(Continued)

OTHER PUBLICATIONS

International Preliminary Report on Patentability and Written Opinion for corresponding PCT Application No. PCT/JP2017/004764, 11 pages, dated Sep. 13, 2018.
(Continued)

*Primary Examiner* — Christopher J Kohlman
(74) *Attorney, Agent, or Firm* — Matthew B. Dernier, Esq.

(57) ABSTRACT

A control apparatus is connected to a device for detecting a user's hand motion, controls a motion of a virtual character, and decides, in accordance with a detection result of hand motion by the device, whether the detected motion is a first instruction action or a second instruction action. The first instruction action achieves a match between a hand motion of the character and the user's hand motion. The second instruction action instructs an action different from the
(Continued)

user's hand motion. When it is decided, as a result of the decision, that the detected user's hand motion is the first instruction action, the control apparatus achieves a match between the character's hand motion and the detected user's hand motion. When it is decided that the detected user's hand motion is the second instruction action, the control apparatus causes the character to perform an action different from the hand motion.

7 Claims, 7 Drawing Sheets

(51) Int. Cl.

| | | |
|---|---|---|
| *A63F 13/215* | (2014.01) | |
| *A63F 13/285* | (2014.01) | |
| *A63F 13/55* | (2014.01) | |
| *A63F 13/428* | (2014.01) | |
| *A63F 13/24* | (2014.01) | |
| *A63F 13/218* | (2014.01) | |
| *G06F 3/16* | (2006.01) | |
| *G06T 13/40* | (2011.01) | |

(52) U.S. Cl.
CPC .......... *A63F 13/285* (2014.09); *A63F 13/428* (2014.09); *A63F 13/54* (2014.09); *A63F 13/55* (2014.09); *G06F 3/01* (2013.01); *G06F 3/016* (2013.01); *G06F 3/017* (2013.01); *G06F 3/16* (2013.01); *G06T 13/40* (2013.01)

(58) Field of Classification Search
CPC ........ A63F 13/21; A63F 13/215; A63F 13/42; A63F 13/54
See application file for complete search history.

(56) References Cited

U.S. PATENT DOCUMENTS

| | | |
|---|---|---|
| 2002/0084982 A1 | 7/2002 | Rosenberg |
| 2003/0234823 A1 | 12/2003 | Sato |
| 2007/0085157 A1 | 4/2007 | Fadell |
| 2008/0261693 A1* | 10/2008 | Zalewski .............. G06F 3/0304 463/31 |
| 2012/0249417 A1* | 10/2012 | Cho ........................ G06F 3/017 345/156 |
| 2012/0308140 A1 | 12/2012 | Ambrus |
| 2016/0006854 A1 | 1/2016 | Aizawa |
| 2016/0054797 A1 | 2/2016 | Tokubo |
| 2016/0132124 A1 | 5/2016 | Nakamura |

FOREIGN PATENT DOCUMENTS

| | | |
|---|---|---|
| JP | 11195140 A | 7/1999 |
| JP | 2009042796 A | 2/2009 |
| JP | 2011524048 A | 8/2011 |
| JP | 2011238068 A | 11/2011 |
| JP | 2013242652 A | 12/2013 |
| WO | 2012170349 A2 | 12/2012 |
| WO | 2015015843 A1 | 2/2015 |

OTHER PUBLICATIONS

International Search Report for corresponding PCT Application No. PCT/JP2017/004764, 4 pages, dated Apr. 18, 2017.
"[TGS 2015] Yoso Ijo no "Sude Kankaku" ni Odoroki. VR Kukan ni Access suru Shin Device 'Oculus Touch' Taiken Report", [online], 7 pages, [retrieval date Apr. 11, 2017 (Apr. 11, 2017)], Internet, <URL: http://www.4gamer.net/games/195/G019528/20150919032/> (Sep. 19, 2015) (for relevancy see International Search Report for corresponding PCT Application No. PCT/JP2017/004764, 4 pages, dated Apr. 18, 2017 cited above).
Supplementary Search Report for corresponding EP Application No. 177596004, 16 pages, dated Sep. 10, 2019.
International Search Report for corresponding Application PCT/JP2017/016770, 4 pages, dated Jul. 18, 2017.
Extended European Search Report for related EP Application No. 17759600.4, 16 pages, dated Oct. 18, 2019.
Amato N M et al., "A Generalized Framework for Interactive Dynamic Stimulation for MultiRigid Bodies" IEEE Transactions on Systems, Man and Cybernetics, Part B: Cybernetics. vol. 34, No. 2, pp. 912-924 (Apr. 1, 2004).

* cited by examiner

| INSTRUCTION DETAIL DATA | ACTION DETAIL DATA |
|---|---|
| BRING THE THUMB CLOSE TO THE TILTING OPERATION MEMBER 232a | TAKE A "READY-TO-RUN" POSTURE WITH FISTS CLOSED |
| OPERATE THE TILTING OPERATION MEMBER 232a | SWING THE ARMS AND RUN |
| ⋮ | ⋮ |

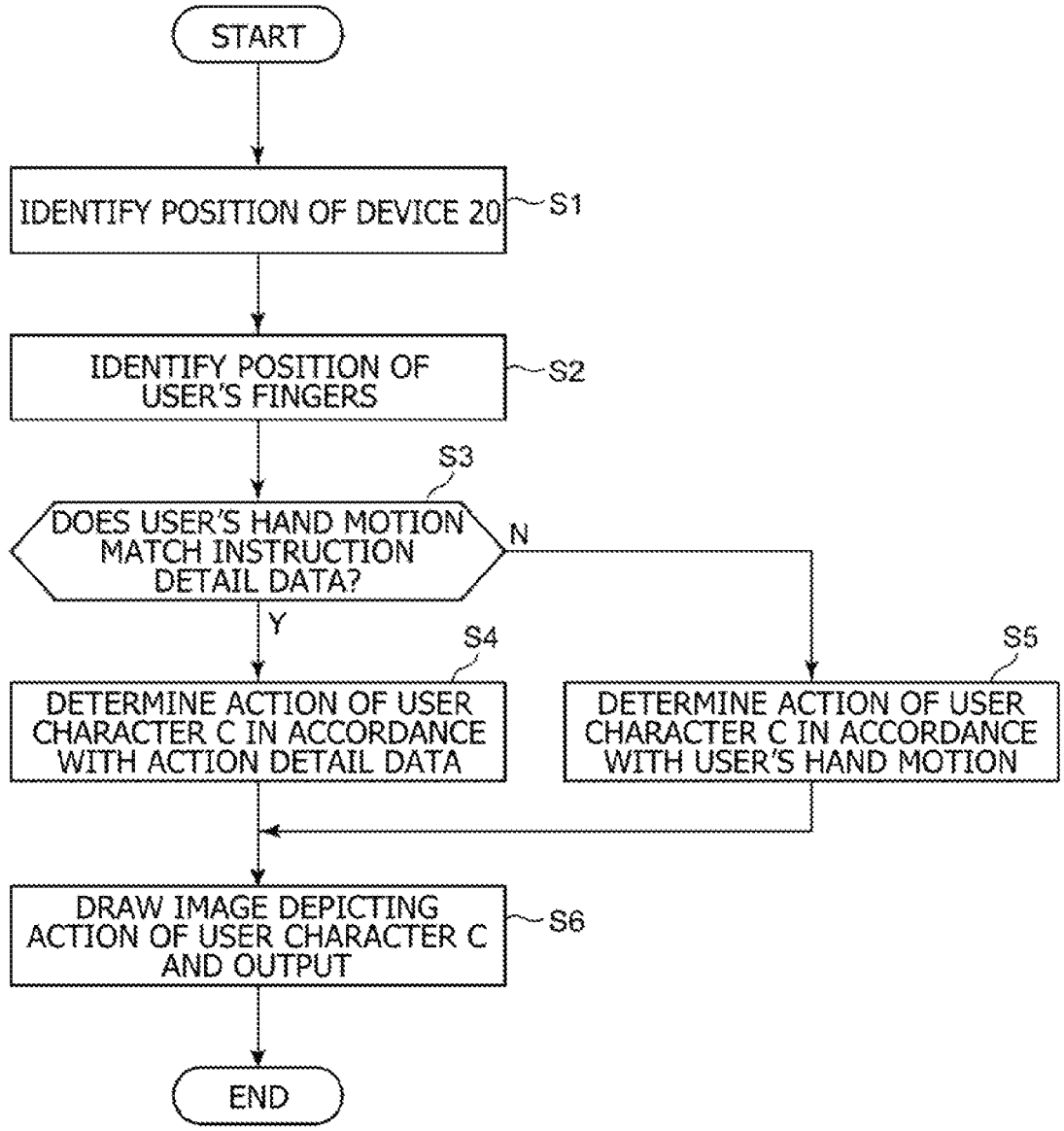

CONTROL APPARATUS

TECHNICAL FIELD

The present invention relates to a control apparatus, a control method, and a control program for controlling a device that detects a user's hand motion.

BACKGROUND ART

Controller devices of home gaming consoles and so on detect a user's action such as pressing a button or swinging the device and send information indicating the detected user's action to the main bodies of the gaming consoles and so on.

Of these controllers, some incorporated an acceleration sensor and other sensors to detect and output the timing at which and the magnitude of force with which the controller is being swung when a user performed an action of swinging the device itself. Also, a device that is worn on a user's hand like a glove and detects finger actions is known.

SUMMARY

Technical Problem

In the case where the above conventional devices are not worn on a user's hand, however, they can only detect an action performed on the devices by the user. Also, although a glove-like device can detect user's hand actions, there were cases in which it was difficult to issue complicated instructions to a computer with hand motions alone.

The present invention has been devised in light of the above circumstances, and it is an object of the present invention to provide a control apparatus that can accept a variety of instructions from a user by controlling a device worn on a user's hand, and a control method and a control program of the device.

Solution to Problem

A control apparatus according to the present invention is a control apparatus that is connected to a device for detecting a user's hand motion and controls a motion of a virtual character. The control apparatus includes a decision section and a character control section. The decision section decides, in accordance with a detection result of the user's hand motion by the device, whether the detected user's hand motion is a first instruction action or a second instruction action. The first instruction action achieves a match between a hand motion of the character and the user's hand motion. The second instruction action instructs an action different from the user's hand motion. When it is decided, as a result of the decision, that the detected user's hand motion is the first instruction action, the character control section achieves a match between the character's hand motion and the detected user's hand motion. When it is decided that the detected user's hand motion is the second instruction action, the character control section causes the character to perform, on the basis of the detected user's hand motion, an action different from the hand motion.

A control method according to the present invention is a control method for controlling a motion of a virtual character using a device for detecting a user's hand motion. The control method decides, in accordance with a detection result of the user's hand motion by the device, whether the detected user's hand motion is a first instruction action or a second instruction action. The first instruction action achieves a match between a hand motion of the character and the user's hand motion. The second instruction action instructs an action different from the user's hand motion. When it is decided, as a result of the decision, that the detected user's hand motion is the first instruction action, the control method achieves a match between the character's hand motion and the detected user's hand motion. When it is decided that the detected user's hand motion is the second instruction action, the control method causes the character to perform, on the basis of the detected user's hand motion, an action different from the hand motion.

A program according to the present invention is a program for controlling a motion of a virtual character using a device for detecting a user's hand motion. The program causes a computer to function as a decision section and a character control section. The decision section decides, in accordance with a detection result of the user's hand motion by the device, whether the detected user's hand motion is a first instruction action or a second instruction action. The first instruction action achieves a match between a hand motion of the character and the user's hand motion. The second instruction action instructs an action different from the user's hand motion. When it is decided, as a result of the decision, that the detected user's hand motion is the first instruction action, the character control section achieves a match between the character's hand motion and the detected user's hand motion. When it is decided that the detected user's hand motion is the second instruction action, the character control section causes the character to perform, on the basis of the detected user's hand motion, an action different from the hand motion. The program may be provided stored in a computer-readable and non-temporary information storage media.

BRIEF DESCRIPTION OF DRAWINGS

FIG. 7 is a flowchart illustrating an example of a processing flow performed by the control apparatus according to the embodiment of the present invention.

DESCRIPTION OF EMBODIMENT

An embodiment of the present invention will be described with reference to drawings. It should be noted that, in the description given below, the size of each section, the ratio in size between the respective sections, the layout thereof, and so on are merely examples, and that examples of embodiments of the present invention are not limited to the size, the ratio in size, and the layout illustrated and so on.

Figure 1:
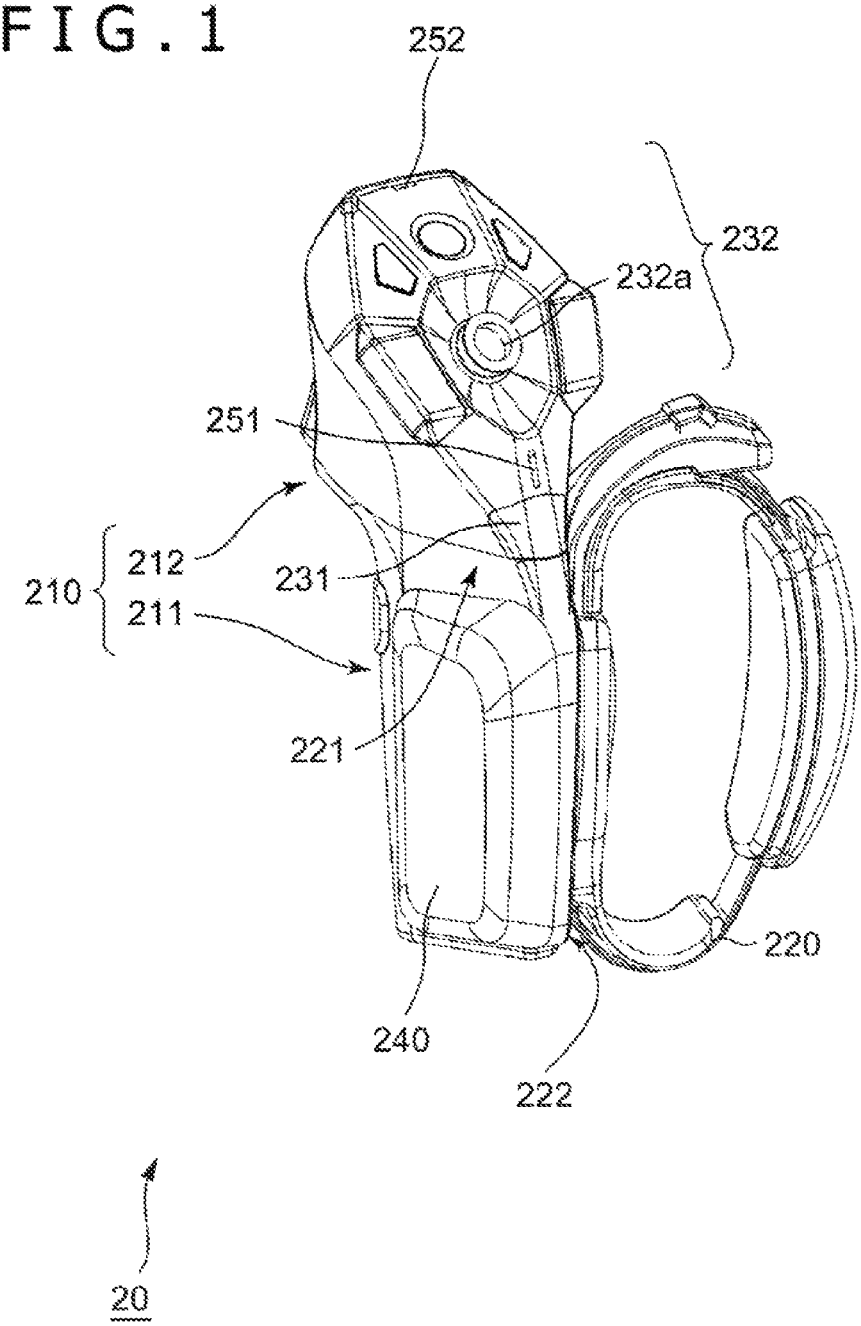
FIG. 1 is a perspective view of a device controlled by a control apparatus according to an embodiment of the present invention as seen from the front side.
Figure 2:
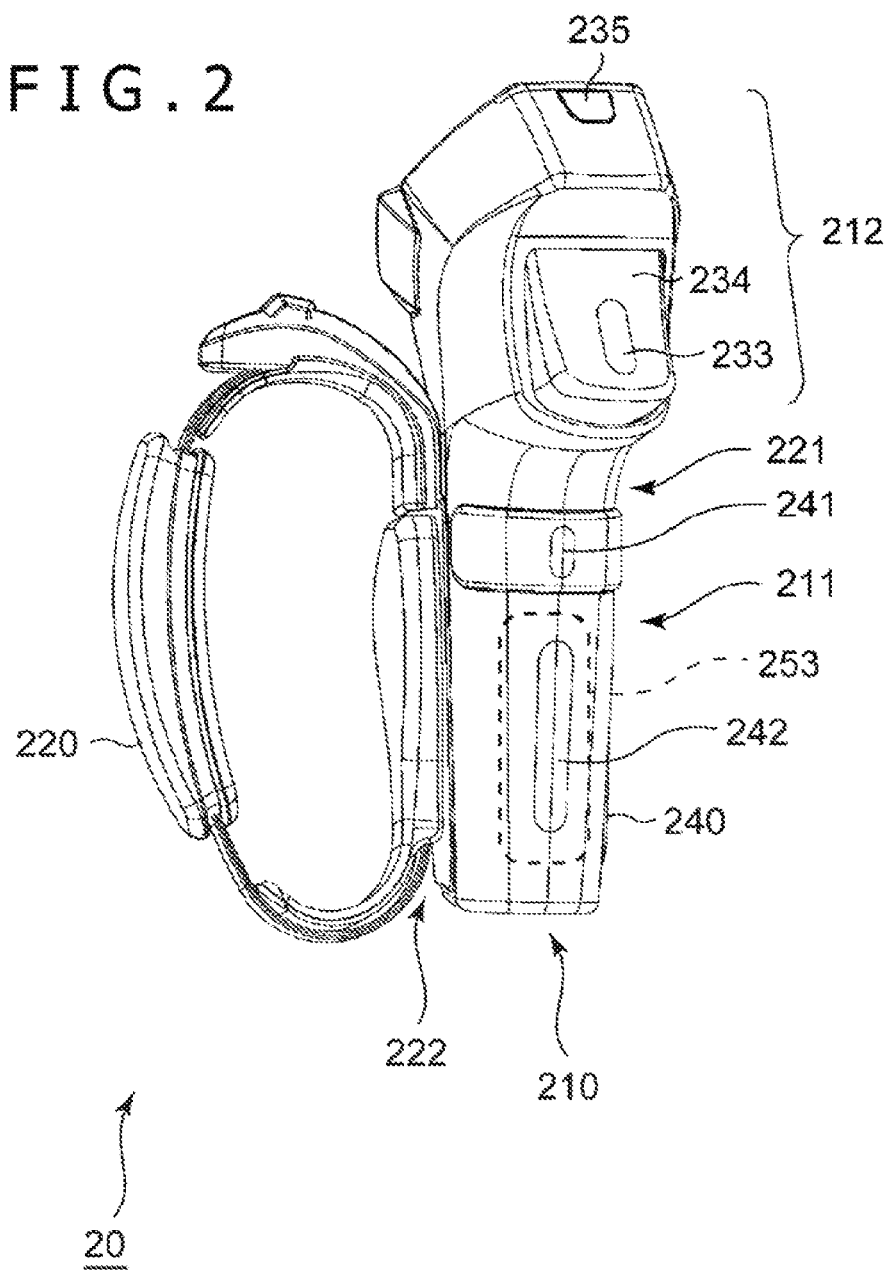
FIG. 2 is a perspective view of the device controlled by the control apparatus according to the embodiment of the present invention as seen from the rear side.

A device 20 to be controlled by a control apparatus 10 according to an example of an embodiment of the present invention is something like that illustrated in FIGS. 1 and 2. FIG. 1 is a perspective view of the device 20 as seen from the front side, and FIG. 2 is a perspective view of the device 20 as seen from the rear side. In an example of the present embodiment, this device 20 includes a device main body 210 and a fixture 220, an accessory.

The device main body 210 includes a grip section 211 gripped by the user and an operation section 212. The grip section 211 has a left side surface 221 and a right side surface 222 and is substantially in the shape of a polygonal column in an example of the present embodiment. The operation section 212 is formed continuously from the grip section 211, includes, in the example illustrated in FIGS. 1 and 2, a thumb sensor section 231 and a button operation section 232 on a front side, and a first finger sensor 233, a rocking button 234, and a display section 235 on a rear side. Also, a second finger sensor 241 and a third finger sensor 242 are provided on a rear side of the grip section 211.

The fixture 220 as an accessory is secured to one of the left side surface 221 and the right side surface 222 of the device main body 210. Also, a battery 240 as anther accessory may be secured to the other of the left side surface 221 or the right side surface 222. In an example of the present embodiment, the fixture 220 is a flexible belt formed in an annular shape.

To use this device 20, the user passes his or her index finger through little finger through the fixture 220 and secures the device 20 at the position where the device main body 210 is in contact with the base of the user's thumb. In the example illustrated in FIGS. 1 and 2, the device 20 is secured with the right side surface 222 of the device 20 pressed against the palm of the user's hand. Also, this device 20 is sized to such an extent that when the user grips the device main body 210 in a natural manner, the distal phalanx side of the user's thumb reaches the button operation section 232 on the front side of the device 20 and the proximal phalanx side of the user's thumb approaches the thumb sensor section 231. Also, at this time, the user's index finger is located where it touches the rocking button 234 on the rear side of the device 20, and the user holds the grip section 211 firmly with his or her palm, middle finger, ring finger, and little finger. However, even if the user opens his or her hand in this condition, the device 20 is secured to the user's hand by the fixture 220, thereby preventing the device 20 from falling.

The thumb sensor section 231 is provided, for example, slightly below the position reached by the distal phalanx side of the user's thumb and provided at the position approached by the proximal phalanx side of the user's thumb when the user grips the device main body 210 in a natural manner. The thumb sensor section 231 has a detectable range of a relatively wide angle on the front side of the device 20 centered at the normal direction of the surface of the device 20 and extending from the left side surface to the right side surface on the front of the device 20 and detects the user's thumb in this detectable range. Then, the thumb sensor section 231 detects the position where the thumb was detected (angle within the above angle range) and the distance from the thumb sensor section 231 to the detected user's thumb and outputs detection result information including these pieces of information to the control apparatus 10. This thumb sensor section 231 may be a sensor of any kind such as camera, optical sensor, pyroelectric sensor, and capacitive sensor. The button operation section 232 includes at least one button and outputs, to the control apparatus 10, information identifying the button operated when the user performs a pressing operation. Also, the button operation section 232 includes a tilting operation member 232a at the center thereof. The tilting operation member 232a is an operating member for the user to perform an operation of tilting the tilting operation member 232a in an arbitrary direction (tilting operation) so as to specify a direction, and the tilting operation member 232a outputs, to the control apparatus 10, information regarding tilting direction and amount of tilt in the case where a tilting operation is performed.

The rocking button 234 swings between a protruding first position on the rear side of the device 20 and a pushed-in second position on the side of the device 20. The rocking button 234 is pushed in by the user with the index or other finger and outputs, to the control apparatus 10, information indicating the amount of pushing in. Specifically, although this rocking button 234 can include a potentiometer or other component, the rocking button 234 is not limited thereto in configuration as long as the amount of pushing in can be detected.

The display section 235 includes, for example, a light emission diode (LED) capable of emitting light in multiple colors. This display section 235 causes the LED to emit light in accordance with an instruction input from the control apparatus 10 in the manner of light emission instructed (e.g., light up in the color instructed or light up intermittently at instructed intervals).

Also, in the present embodiment, the first finger sensor 233 is attached to this rocking button 234. The first finger sensor 233 has a detectable range spanning a given range of angles on the rear side of the device 20 centered at the normal direction of the surface of the device 20 and detects the user's index finger in this detection range. That is, the first finger sensor 233 detects the position of the index finger (angle within the above angle range) and the distance from the first finger sensor 233 to the index finger and outputs detection result information including these pieces of information to the control apparatus 10. The first finger sensor 233 may be a variety of sensors such as optical sensor as with the thumb sensor section 231.

Further, in an example of the present embodiment, a force sense presentation apparatus may be connected to the rocking button 234. This force sense presentation apparatus presents the force that resists the pushing in of the rocking button 234 in accordance with an instruction input from the control apparatus 10. Specifically, this force sense presentation apparatus can include a motor, a linear actuator, and so on. The motor includes a rotor that rotates when the rocking button 234 is pushed in. The linear actuator has a driven body that moves linearly as the rocking button 234 is pushed in. In the case where a motor is used as described above, the force sense presentation apparatus controls the motor and the actuator such that when rotation resulting from the pushing in or movement of the driven body takes place, a force is applied in the direction opposite to the rotation or movement. A widely known apparatus is used as such a force sense presentation apparatus, and therefore a detailed description thereof is omitted here.

The second finger sensor 241 detects how close the user's middle finger is to the grip section 211 of the device 20. Then, the second finger sensor 241 outputs information indicating the detection result to the control apparatus 10. Similarly, the third finger sensor 242 detects how close each of the user's ring finger and little finger is to the grip section 211 of the device 20. Then, the third finger sensor 242 outputs information indicating the detection result to the control apparatus 10. Both of the second finger sensor 241 and the third finger sensor 242 can include a capacitive sensor, an optical sensor, and so on. Here, some optical sensors available include a light-emission section that emits infrared light and a light reception section that detects infrared light and measures the ratio of light that is reflected by a target and enters the light reception section to light emitted from the light emission section. According to such optical sensors, the closer the target approaches the optical sensor, the greater the ratio (referred to as the specific intensity) r obtained by dividing the intensity of light entering the light reception section by the intensity of light emitted from the light emission section, making it possible to measure the distance to the target. Also, the optical sensor may be one that measures the distance to the target through a time-of-flight (TOF) method. In this case, the optical sensor measures the distance to the target on the basis of the time it takes until light emitted from the light emission section to be reflected by the target enters the light reception section.

Also, in the present embodiment, the device 20 includes a sensor (fixture sensor) that detects which side, the left side surface 221 or the right side surface 222, the fixture 220, an accessory, is secured to. Specifically, this fixture sensor can be realized by providing, on each of the left side surface 221 and the right side surface 222, a microswitch or other switch that turns ON when the fixture 220 is put on. As for a configuration for detecting the side to which such a given accessory is attached at the time of attachment, other widely known methods can be used in addition to the above. Therefore, a detailed description thereof is omitted here. In the present embodiment, the detection result by this fixture sensor is input to the control apparatus 10.

Also, the device main body 210 incorporates a speaker 251, a microphone 252, and a haptic device 253 in its housing. The haptic device 253 presents tactile sense by vibrating the device main body 210 and transferring the vibration to the user's hand to which the device 20 is secured. It should be noted that the plurality of haptic devices 253 may be built into the device main body 210. Further, a light-emitting element for position tracking is provided on the surface of the housing of the device 20 separately from the display section 235. A plurality of light-emitting elements may be provided. The control apparatus 10 identifies the position of the device 20 in a real space from the position of light emitted from this light-emitting element.

Figure 3:
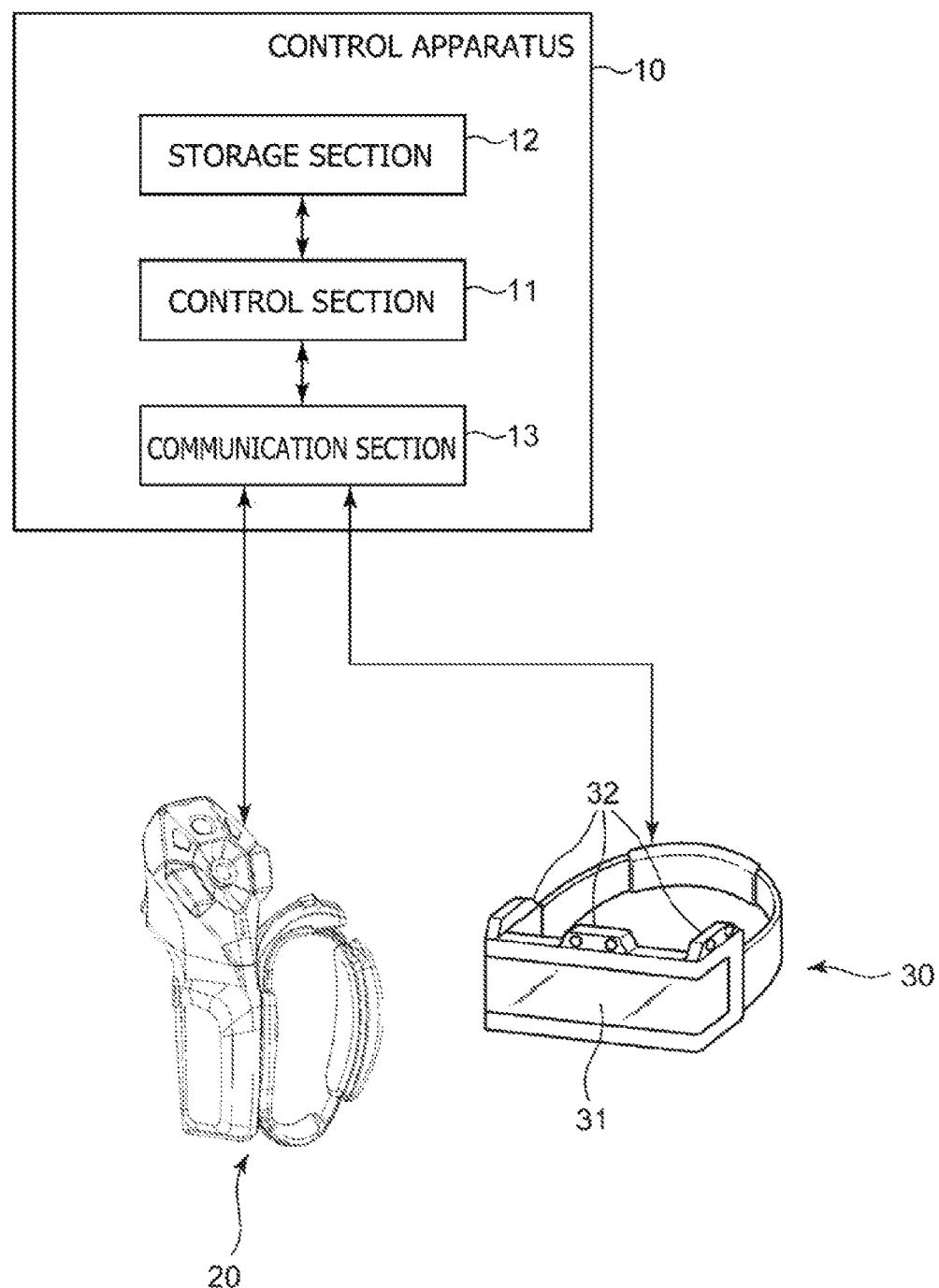
FIG. 3 is a block diagram illustrating a configuration example of the control apparatus according to the embodiment of the present invention.

The control apparatus 10 is an information processing apparatus that is connected to the device 20 for communication and may be, for example, a home gaming console, a personal computer, or the like. Also, in the present embodiment, the control apparatus 10 is connected to a head-mounted display apparatus 30 for communication. This control apparatus 10 includes a control section 11, a storage section 12, and a communication section 13 as illustrated in FIG. 3. The control section 11 includes a program-controlled device such as a central processing unit (CPU) and performs a variety of information processing tasks in accordance with the program stored in the storage section 12. In the present embodiment, the control section 11 not only draws an image depicting the appearance of the inside of a virtual space and causes the display apparatus 30 to display the image on screen but also updates the image in response to user action detected by the device 20. Details of specific processes performed by this control section 11 will be described in detail later.

The storage section 12 is a memory device or the like and retains a program executed by the control section 11. This program may be a program provided stored in a computer-readable and non-temporary storage media and copied to this storage section 12. Also, this storage section 12 operates as a work memory of the control section 11.

The communication section 13 includes a serial interface such as a universal serial bus (USB) or a wireless communication interface such as Bluetooth (registered trademark). The control apparatus 10 is connected to the device 20 via the communication section 13 in a manner that allows communication. Particularly in the present embodiment, the communication section 13 receives, from the device 20, information regarding detection results of the thumb sensor section 231, the first finger sensor 233, the second finger sensor 241, and the third finger sensor 242 and information indicating the detail of the operation performed by the user on the button operation section 232 and the rocking button 234. Also, the communication section 13 sends, in accordance with an instruction from the control section 11, a signal that activates the force sense presentation apparatus connected to the rocking button 234 and the haptic device 253 in the device main body 210.

Further, the communication section 13 includes a communication interface for wired or wireless communication with the display apparatus 30. The control apparatus 10 sends video data to be displayed by the display apparatus 30 to the display apparatus 30 via the communication section 13. Also, the communication section 13 receives, from the display apparatus 30, captured image data captured by a camera 32 included in the display apparatus 30.

The display apparatus 30 is a head-mounted display or the like, a device to be worn on the head for use by the user. The display apparatus 30 includes a video display element 31 and the plurality of cameras 32.

The video display element 31 presents the user with video based on data received from the control apparatus 10 by forming an image in front of the user's eyes or directly in retinas. Particularly in the present embodiment, stereoscopic display by binocular parallax is realized as the video display element 31 presents the user's left and right eyes with different pieces of video.

The plurality of cameras 32 capture surrounding images of the display apparatus 30. These cameras 32 are provided to face forward or to the left and right of the display apparatus 30. When the user wears the display apparatus 30 on his or her head and the device 20 on his or her hand to use them, it is assumed that the device 20 appears in the image captured by the camera 32. This captured image is used by the control apparatus 10 to identify the position of the device 20. It should be noted that the cameras 32 may be, for example, imaging devices capable of detecting the distance to a subject such as stereo cameras.

Figures 4, 5:
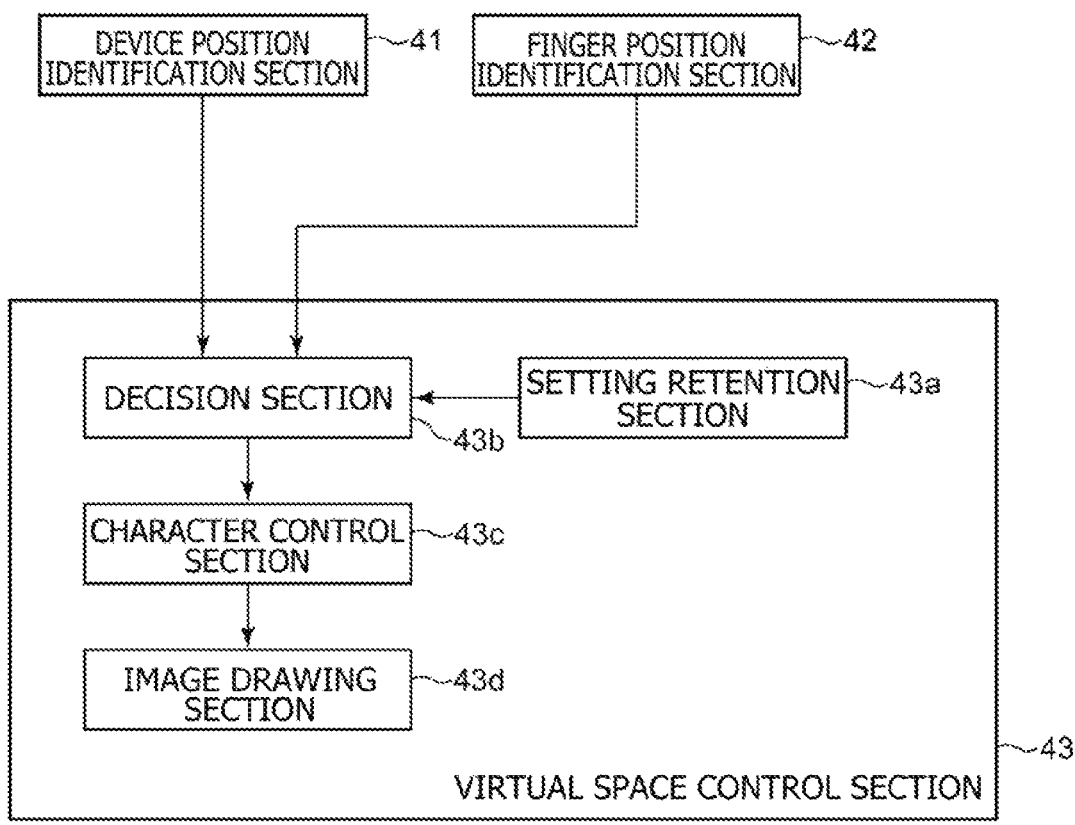
FIG. 4 is a functional block diagram illustrating functions of the control apparatus according to the embodiment of the present invention.
FIG. 5 is a diagram illustrating an example of details of action pattern setup data.

A description will be given below of the operation of the control section 11 of the control apparatus 10. In the present embodiment, the control section 11 functionally includes a device position identification section 41, a finger position identification section 42, and a virtual space control section 43 as illustrated in FIG. 4. Further, the virtual space control section 43 includes a setup retention section 43a, a decision section 43b, a character control section 43c, and an image drawing section 43d.

The device position identification section 41 performs position tracking of the device 20. This is a process that identifies the position of the device 20 in a real space relative to the position of the display apparatus 30. Specifically, the device position identification section 41 instructs the device 20 to cause the light-emitting element for position tracking to emit light first before initiating position tracking of the device 20. Thereafter, the device position identification section 41 receives captured images captured by the cameras 32 from the display apparatus 30 and detects light emitted by the light-emitting element from the captured images by analyzing the captured images. The device position identification section 41 identifies the position of the device 20 in a real space relative to the position of the display apparatus 30 by using the position of light in the captured images. By repeating such a process, it is possible for the device position identification section 41 to track the position of the user's hand wearing the device 20 while the user is moving the hand freely.

The finger position identification section 42 identifies the positions of the user's fingers as seen from the device 20 by using detection results of the thumb sensor section 231, the first finger sensor 233, the second finger sensor 241, and the third finger sensor 242 of the device 20. Because the device 20 is secured to the user's palm by the fixture 220 as described earlier, there is no need for the user to continue to grip the device 20 with his or her fingers, and the user can freely move the five fingers to a certain extent with the device 20 worn. The finger position identification section 42 identifies the positions of the five fingers.

Specifically, the finger position identification section 42 identifies the position of the user's thumb in a real space by using the detection result of the thumb sensor section 231. Also, the finger position identification section 42 identifies the position of the index finger from the detection result of the first finger sensor 233, the position of the middle finger from the detection result of the second finger sensor 241, and the positions of the ring finger and the little finger from the detection result of the third finger sensor 242. It should be noted that because the second finger sensor 241 and the third finger sensor 242 detect the distance to the target as described earlier, it is difficult to detect vertical and horizontal finger motions as seen from the sensor positions. With the device 20 secured to the user's hand with the fixture 220, however, it is assumed that although the three fingers—the middle finger, the ring finger, and the little finger—all move away from the device 20 when these fingers are extended and approach the device 20 when they are bent, they do not move much in the direction parallel to the housing surface of the device 20. For this reason, it can be presumed as for these fingers that in the case where a finger can be detected by the second finger sensor 241 or the third finger sensor 242, the finger is bent to that distance and that in the case where a finger cannot be detected, the finger has moved out of the detection range as a result of extension of the finer by the user. As for the thumb and the index finger, on the other hand, it is possible to identify the three-dimensional positions by using detection results of the thumb sensor section 231 and the first finger sensor 233.

Thus, the finger position identification section 42 identifies the user's hand motion by identifying the position of each of the user's five fingers. Specifically, the finger position identification section 42 can distinguish and identify a user's action of holding the device 20 firmly by bringing all the five fingers into contact with the device 20, extending all the fingers, and extending only some of the fingers. For this reason, for example, the finger position identification section 42 can identify various user's hand actions such as forming one of "rock" (closed fist), "scissors" (peace sign), and "paper" (flat hand) in rock-paper-scissors with the hand, pointing somewhere with the index finger, and intending to operate the button on the device 20 with the thumb or the index finger and perform a process corresponding to the identified action.

The virtual space control section 43 provides a function that allows the user to undergo various experiences in a virtual space. Specifically, the virtual space control section 43 places a virtual character (hereinafter referred to as a user character C), a user's avatar, in a virtual space, draws video depicting the appearance of the inside of the virtual space, and displays the video on the display apparatus 30. Here, the user character C is at least in the shape imitating a human hand and has joints that move in the similar manner to human fingers do. It should be noted that we assume, in the description given below, that the user character C is in the shape close to a whole human body and that not only the hands but also the legs and so on move in a similar manner to that of human's. The user operates the user character C by moving his or her own hand and fingers wearing the device 20. The user can also operate the user character C by making an operation input to the button operation section 232 or the rocking button 234. User actions for operating the user character C will be hereinafter referred to as instruction actions.

Particularly in the present embodiment, the user character C moves in two action modes. These two action modes will be hereinafter referred to as a first action mode and a second action mode. The first action mode is a mode in which the user character C moves in a virtual space in a manner linked to the user's motion. In the first action mode, the virtual space control section 43 moves the user character C to match the user's hand motion on the basis of the position of the device 20 identified by the device position identification section 41 and the positions of the user's fingers identified by the finger position identification section 42. That is, in the first action mode, a user's arbitrary hand motion is used as an instruction action in an 'as-is' manner. This makes it possible for the user to touch an object in a virtual space by operating the user character C as if the user character C were the user himself or herself.

The second action mode is a mode in which the user character C moves differently from the user's action. In the second action mode, the user performs a specific instruction action such as operating the button on the button operation section 232 or making a gesture with finger motions. The character control section 43*c* causes the user character C to perform an action of a predetermined pattern in accordance with the detail of the instruction action.

In order to realize actions of the user character C in these two action modes, the setup retention section 43*a* retains in the storage section 12 in advance, in relation to a user's hand motion corresponding to an instruction action in the second action mode, setup information that associates a detail of the hand motion (instruction detail data) and a detail of the action of the user character C corresponding to that instruction action. This setup information will be hereinafter referred to as action pattern setup data. FIG. 5 illustrates an example of details of data included in action pattern setup data. It should be noted that although this figure illustrates instruction detail data and action detail data with text, instruction detail data may be actually data that identifies a detection range of each finger when the user moves the hand to form a specific shape or data that defines conditions regarding the detail of the operation such as amount of pushing in of the operating member of the button operation section 232 or the rocking button 234 to be operated by the user. Also, instruction detail data may include not only finger positions but also conditions regarding the position of the device 20 (i.e., user's hand position) identified by the device position identification section 41. Also, action detail data may be data that defines motions of a skeleton model included in the user character C, data required to generate animation in which the user character C moves, various types of data required for actions of the user character C, and so on.

The decision section 43b refers to the user's hand motion identified by the finger position identification section 42 and the action pattern setup data retained by the setup retention section 43a and decides whether an identified user's hand motion is an action in the first action mode or an action in the second action mode. Specifically, in the case where the user's hand motion falls under a piece of instruction detail data included in the action pattern setup data, it can be decided that the user is performing an instruction action in the second action mode. In the case where the user's hand motion does not fall under any of pieces of instruction detail data included in the action pattern setup data, it can be decided that the user is performing an instruction action in the first action mode.

The character control section 43c performs control to move the user character C in a virtual space on the basis of the decision result of the decision section 43b. Specifically, in the case where it is decided that the user is performing an instruction action in the first action mode, the hand of the user character C is moved to match the user's hand motion identified by the finger position identification section 42. At this time, the character control section 43c may move the user character C to match not only the hand shape but also the hand position using information regarding the position of the device 20 identified by the device position identification section 41. It should be noted that the character control section 43c may estimate positions of other areas of the user's body that are not detected from the identified positions of the user's fingers and hand by using inverse kinematics technology or the like and move the parts included in the entire body of the user character C in accordance with the estimation result thereof. On the other hand, in the case where it is decided that the user is performing an instruction action in the second action mode, the character control section 43c moves the user character C in accordance with the detail of action indicated by the action pattern setup data. The action of the user character C in this case is different from the user's hand motion.

The image drawing section 43d draws an image depicting the appearance of the inside of the virtual space in which the user character C who moves as described above is placed and outputs the image to the display apparatus 30. For example, the image drawing section 43d draws the appearance of the inside of the virtual space as seen from a viewpoint position established at the position corresponding to the head of the user character C. This allows the user to view the scenery in the virtual space from a first person's viewpoint as if the user became the user character C. Also, the viewpoint position may be provided in the back of the user character C. In this case, the user can view the scenery in the virtual space including the user character C from a bird's-eye viewpoint.

In the case of not only a bird's-eye viewpoint but also a first person's viewpoint, the hand of the user character C can be included in the image drawn by the image drawing section 43d. In the first action mode, this hand of the user character C moves to match the user's hand motion. Further, in the case of a first person's viewpoint, the viewpoint position and the direction of line of sight in the virtual space may change in a manner linked to the motion of the display apparatus 30 worn on the user's head. This ensures that the hand of the user character C is displayed on the screen of the display apparatus 30 when the user faces his or her own hand, allowing the user to feel as if the hand of the user character C were his own.

Figure 6A:
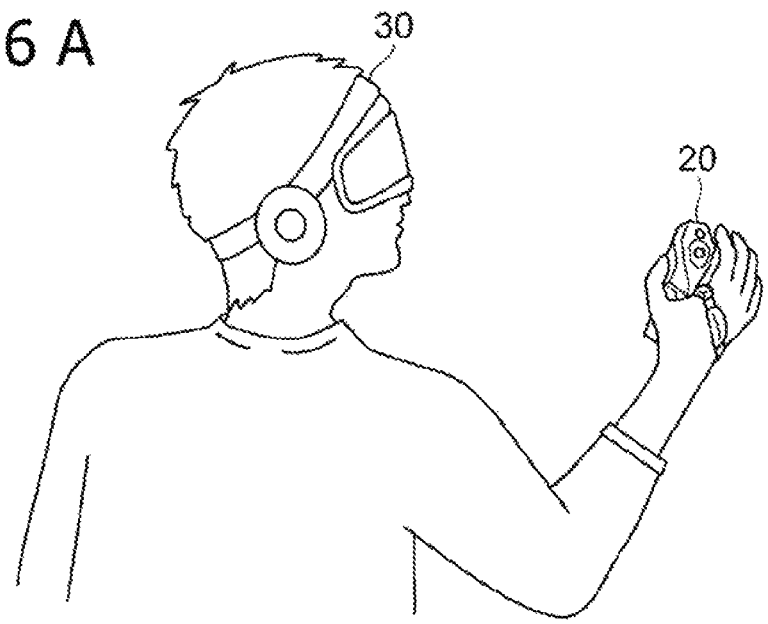
FIG. 6A is a diagram illustrating an example of the manner in which a user performs an instruction action.
Figure 6B:
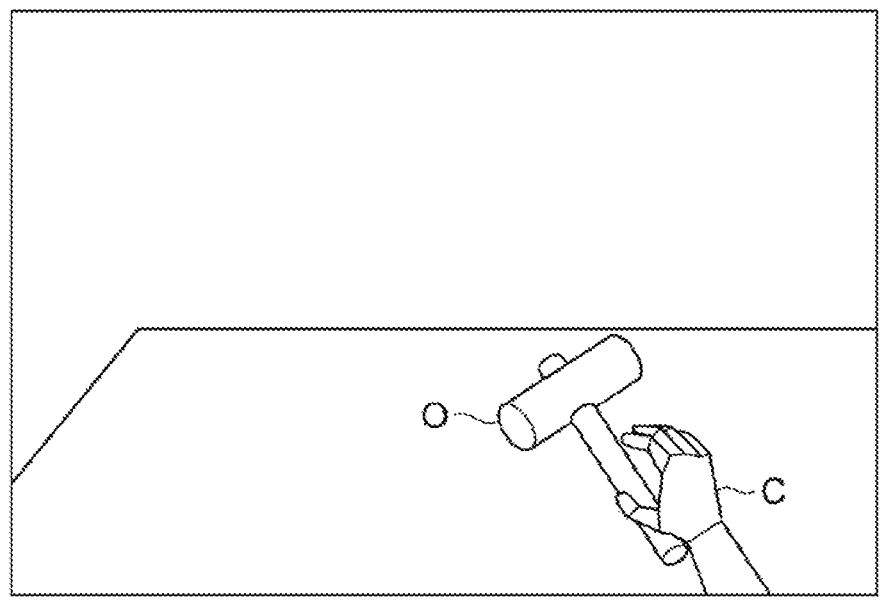
FIG. 6B is a diagram illustrating an example of displaying a user character in response to an instruction action.

In the first action mode, the user character C in the virtual space including even the fingers moves in a manner linked to the user himself or herself. For this reason, the user can realize, with exactly his or her own motions, actions such as touching and pinching an object in the virtual space, defending against an attack from an enemy character, and punching an enemy character. FIGS. 6A and 6B illustrate an example of the manner in which the user's hand motion is linked to the hand motion of the user character C in the display screen. FIG. 6A illustrates the manner in which the user moves the hand wearing the device 20 forward and moves the fingers to form a shape that looks like grabbing something in a real space. Also, FIG. 6B illustrates an example of a display image drawn by the image drawing section 43d in a manner linked to the user's motion illustrated in FIG. 6A and illustrates the manner in which the hand of the user character C is attempting to grab an object O in the virtual space.

Also, the virtual space control section 43 may generate various events in the virtual space in response to specific gestures of the user. For example, the virtual space control section 43 may display a menu screen in the virtual space and cause the user to select a menu item therein. The user can select a menu by performing an instruction action such as pointing to a desired menu item in the menu screen with a finger. Also, in the case where the user moves the hand with the index finger extended, the virtual space control section 43 may display the path traced by the index finger in the air in the virtual space. This allows the user to draw a picture or letter in the air. Also, the virtual space control section 43 may cause the user character C to use a weapon in response to a specific user gesture and produce an effect of attacking an enemy with a laser or other feature.

During action in the first action mode as described above, the user may operate the operating member of the button operation section 232 or the rocking button 234. In response to such a button operation, the virtual space control section 43 causes the user character C to perform a predetermined special action and generate some kind of event in the virtual space. Specifically, the virtual space control section 43 may assign actions such as selecting a weapon and causing the user character C to run to button operations. This makes it possible for the user to cause the user character C to perform an action that is difficult to reproduce with a hand motion alone while at the same time moving the user character C to match the motion of his or her own hand. In this case, it is likely that if the hand of the user character C is linked to the motion of the user's hand operating a button or other member, the motion of the user character C may become unnatural. For this reason, in the present embodiment, in the case where the user attempts to perform such an operation by including instruction detail data indicating the user's hand motion of operating a button or other member in the action pattern setup data, the decision section 43b decides that the user is performing an instruction action in the second action mode and switches the mode from the first action mode to the second action mode. This ensures that the action of the user character C temporarily does not match the user's hand motion, making it possible to move the user character C in a predetermined action pattern that does not cause a sense of discomfort to the user.

As a specific example, in the case where the tilting operation member 232a is tilted, the character control section 43c moves the user character C in the virtual space in the direction corresponding to the tilting direction. At this time, the character control section 43c causes the user character C, for example, to perform an action of running toward the direction instructed. In this example, while the user character C is running, it is not necessary to ensure that the hand of the user character C matches the user's hand that is performing a tilting operation. For this reason, in the case where the user performs a tilting operation, it is only necessary to cause the user character C to perform an action of a predetermined pattern (e.g., swinging the arm with closed fist).

Further, in this example, also in the state where the user is bringing his or her fingers close to the tilting operation member 232a in order to start the tilting operation and in the state where the user suspends the tilting operation and waits with his or her thumb on the tilting operation member 232a, it is not necessary to ensure that the hand of the user character C is linked to the user's hand motion. In the present embodiment, the device 20 can identify a detailed motion of the user's hand. For example, therefore, in the case where the user's hand moves to a given range close to the tilting operation member 232a, the character control section 43c may cause the user character C to perform an action in the second action mode. According to such control, it is possible to cause the user character C to perform an action different from the user's hand motion not only while the user is actually operating a button or the tilting operation member 232a but also in the state where the user is about to start an operation and in the state where the user temporarily suspends the operation.

For example, in the example where the user character C performs a running action in response to the tilting operation, in the case where it is decided that the user is bringing his or her thumb close to the tilting operation member 232a, the character control section 43c may cause the user character C to take a "ready-to-run" posture with arms in position. Also, in the case where it is decided that the user keeps his or her finger on the tilting operation member 232a after having performed a tilting operation although the user has restored the tilting operation member 232a to its initial position, the character control section 43c may cause the user character C to continue to perform a jogging action. In the case where the user completely takes his or her hand off the tilting operation member 232a thereafter, the decision section 43b switches the mode from the second action mode to the first action mode and resumes control to link the user character C to the user's hand motion.

It should be noted that similar control may be performed in the case where the user operates other operating member of the button operation section 232 or the rocking button 234 in addition to the tilting operation member 232a. In order to achieve such control, it is only necessary to include, in the action pattern setup data, instruction detail data indicating the user's finger motions of operating an operating member of the button operation section 232 or the rocking button 234 and action detail data of the user character C corresponding thereto.

Also, in the case where the user brings his or her finger close to the button operation section 232 or the rocking button 234, the character control section 43c may cause the user character C to change the hand to a given reference posture (natural posture such as a hand-open state) or maintain the hand shape at the time of performing an action in the first action mode, irrespective of which button the user intends to operate. According to such control, it is possible to switch between the first action mode and the second action mode in a natural manner without causing a sense of discomfort to the user.

It should be noted that although, in the above description, the user wore only one device 20 on one of his or her hands and performed an instruction action, the user may wear the device 20 on each of his or her hands. As described earlier, the fixture 220 can be secured to both the left and right side surfaces of the device main body 210. For this reason, the same device 20 can be used for both the left and right hands in accordance with the position where the fixture 220 is secured. If the two devices 20 are available and each is worn on one of the left and right hands, the finger position identification section 42 can identify the positions of all the fingers of both hands of the user all at once. Also, the device position identification section 41 can track the positions of the devices 20 worn respectively on the left and right hands by using images captured by the plurality of cameras 32. For this reason, the character control section 43c can move both the left and right hands of the user character C to match both hands of the user in the first action mode. Also, in the second action mode, the character control section 43c can cause the user character C to perform an action whose detail is appropriate to an instruction action that is a combination of both of the user's hands.

Also, although, in the above description, only the hands of the user character C moved in a manner linked to the user's hand motions in the first action mode, the character control section 43c may not only move the hands of the user character C but also move other areas in accordance with a given control condition. For example, if the display apparatus 30 incorporates a motion sensor and so on, the control apparatus 10 can identify the motion of the display apparatus 30 in the real space. For this reason, the character control section 43c may change the position and orientation of the head of the user character C in accordance with a detection result of the motion of the display apparatus 30. Also, the character control section 43c may, for example, move the upper body of the user character C to match motions of the user's hands and head while at the same time moving the lower body of the user character C in accordance with a predetermined action pattern. Further, in the case where the user character C is thus moved on the basis of a plurality of control conditions, the positions of a torso and other areas may be calculated on the basis of the positions of the hands and head of the user character C by using inverse kinematics technology or the like to ensure that the user character C as a whole does not assume an unnatural posture, followed by movement of the whole body of the user character C in accordance with the calculation result.

Also, although, in the above description, a match is achieved between the position of the hand and the motions of all the five fingers of the user character C and the user's instruction action in the first action mode, a match may be achieved between only some of these elements and the user's instruction action, and other elements may be moved in accordance with a given control condition without achieving a match with the user's instruction action. As a specific example, the character control section 43c may, while moving the fingers of the user character C to match the positions of the five fingers identified by the finger position identification section 42, move the hand position of the user character C to a given position or keep the hand position unchanged without moving it irrespective of the position of the device 20 identified by the device position identification section 41. Conversely, the character control section 43c may, while controlling the hand position and the arm motion of the user character C to match those of the user in response to the position and posture of the device 20, move the fingers of the user character C without regard to the identification result of the finger position identification section 42. It should be noted that the character control section 43c may selectively use these action modes in accordance with the situation. That is, when determining a detail of action of the user character C, the character control section 43c may switch, as appropriate, between four action modes, an action mode in which a match is achieved between both the position identification result of the device 20 and the user finger position identification result and the action of the user character C, an action mode in which a match is achieved between only the hand position of the user character C and the position identification result of the device 20, an action mode in which a match is achieved between only the finger positions of the user character C and the user finger position identification result, and an action mode (second action mode described earlier) in which the user character C is caused to perform given actions all of whose details are different from those of any of the user's actions. Also, there may be an action mode in which, of the five fingers of the user character C, a match is achieved between the positions of some of the fingers and those of the user's fingers, and other fingers are moved in accordance with a given control condition.

A description will be given here of a specific example of a processing flow performed by the control section 11 with reference to FIG. 7. In the example illustrated in this figure, the device position identification section 41 identifies the position of the device 20 in the real space first (S1). Further, the finger position identification section 42 identifies the respective positions of the five fingers of the hand on which the user is wearing the device 20 (S2).

Thereafter, the decision section 43b refers to the action pattern setup data retained by the setup retention section 43a and decides whether the user's hand motion found from information identified in S1 and S2 matches any piece of the instruction detail data in the action pattern setup data (S3). In the case where it is decided that there is a match, it can be determined that an instruction action in the second action mode was performed. Therefore, the character control section 43c refers to the action detail data associated with the matching instruction detail data and determines the detail of action of the user character C in accordance with the detail thereof (S4). On the other hand, in the case where it is decided in S3 that there is no match with any piece of instruction detail data, it can be determined that an instruction action in the first action mode was performed. Therefore, the character control section 43c determines the detail of action of the user character C to match the user's hand motion (S5). More specifically, the character control section 43c moves the hand of the user character C to the position identified in S1 and moves the respective fingers of the hand of the user character C to the positions identified in S2.

In both cases of S4 and S5, the image drawing section 43d draws an image depicting the manner in which the user character C moves in response to the determined detail of action and outputs drawn image data to the display apparatus 30 (S6). It is possible to cause the user character C to perform various actions in response to the user's hand motion by repeating the above processes every fixed time period.

Further, the virtual space control section 43 may perform various types of control to ensure that the user can undergo various kinds of experiences and more realistic experiences in the virtual space. A description will be given below of a specific example of such control.

A description will be given first of control for enhancing the sense of reality of the virtual space by presenting force sense and tactile sense. In the first action mode, the user can perform an action of causing the hand of the user character C to touch an object in the virtual space by moving his or her own hand. In this case, it is possible to allow the user to perceive the virtual space as being more real by controlling force sense presentation in response to the positional relationship between the object and the user character C in the virtual space. For example, in the case where the user character C attempts to grab the object O as illustrated in FIG. 6B, the user moves his or her hand in such a manner as to hold the grip section 211 of the device 20 firmly. At this time, the user's index finger is moved in such a manner as to push in the rocking button 234.

In this example, the size of the object O in the virtual space does not necessarily match the thickness of the grip section 211 of the device 20. For this reason, the virtual space control section 43 controls the force sense presentation apparatus connected to the rocking button 234 such that when the rocking button 234 is pushed in by the amount of pushing in appropriate to the size of the object O, a force sense is presented that resists the pushing in of the rocking button 234. As a result, when the user bends his or her index finger to the position that matches the size of the object O, it becomes difficult for the user to hold the grip section 211 any more firmly. According to such control, in the case where the size of the object O is small, it is possible to push in the rocking button 234 deeply, and in the case where the size of the object O is relatively large, a force sense is presented immediately, and it becomes impossible to push in the rocking button 234 any further. For this reason, the user can experience a sensation close to a state of actually grasping the object.

It should be noted that the force presentation apparatus connected to the rocking button 234 that is pushed in with the index finger produces a repulsive force. For this reason, the sensation of holding the grip section 211 firmly that matches the size of the object O is perceived only by the index finger. However, the device 20 may be provided with a mechanism that presents other fingers with a force sense equivalent to the amount of pushing in a similar manner. This allows the user to experience a sensation closer to reality when the object O is seized.

Further, the character control section 43c may present the user with a tactile sense using the haptic device 253 not only when the user character C performs an action of seizing an object in the virtual space but also in the case where the user performs an action of touching an object in the virtual space. At this time, the detail, intensity, orientation, and so on of a tactile sense presented to the user may be varied in accordance with the material and weight of the object with which the user character C comes into contact and the positional relationship between the user character C and the object. This allows the user to feel a sensation as if he or she were directly touching a non-existent object in the virtual space. Also, it is possible to prevent the user from erroneously moving his or her hand to the position in the real space where the hand interferes with an object in the virtual space. According to such control, in the case where the user character C performs, for example, an action of placing its hand on a desk and removing an item on the desk in the virtual space, it is possible to convey a sensation of the desk and the item on the desk to the user although the user actually moves within a space in which there is nothing.

Also, in the first action mode, the user may perform an instruction action while holding a 'thing' in the real space analogous to the object in the virtual space. As described earlier, the user can move his or her five fingers freely because it is not necessary to hold the device 20 with his or her hand. This allows the user to hold another 'thing' with his or her hand while wearing the device 20. For this reason, in the case where it is desired to cause the user character C to perform, for example, an action of grasping and moving an object in the virtual space, the user may move his or her hand while holding a 'thing' close in shape to the object in the virtual space to be operated. This allows the user character C to be operated while experiencing a sensation close to reality. For example, the user may perform an instruction action in the first action mode while holding a dish rather than a wheel in his or her hand in the virtual space.

Also, the virtual space control section 43 acquires information regarding a 'thing' existing in the real space and reflects the information into the virtual space. For example, the virtual space control section 43 can realize augmented reality in which a virtual object appears in the real space by using an image captured by the camera 32 of the display apparatus 30, superimposing the virtual object on the captured image, and generating a display image. In this case, the virtual space control section 43 can also produce various effects in the virtual space by detecting the motion of the user's hand that touches and moves a 'thing' in the real space. Also, information regarding the real space may be acquired by using not only the cameras 32 but also the microphone 252 of the device 20. For example, the sound produced when the user strokes a 'thing' with his or her fingers may be collected by the microphone 252 so as to estimate the surface texture of the 'thing' which cannot occasionally be found out with video alone and reflect the surface texture into the behavior of an object in the virtual space.

A description will be given next of an example of interaction between the user and another user in the virtual space. We assume, in this example, that the control apparatus 10 used by the user is connected to another control apparatus 10 (hereinafter referred to as a guest control apparatus 10b) used by another user (hereinafter referred to as a guest user) via a communication network such as the Internet. In the description given below, a user on the local side who interacts with the guest user will be referred to as a local user, and the control apparatus 10 used by the local user will be referred to as a local control apparatus 10a to make a distinction from the guest user and the guest control apparatus 10b. In this example, we assume that the guest user also wears the device 20 according to the present embodiment on his or her hand. We also assume that the local control apparatus 10a causes not only the user character C representing the local user but also a guest character representing the guest user to appear in the virtual space.

In this case, the local control apparatus 10a receives voice data, collected by the microphone 252 of the device 20 worn by the guest user, from the guest control apparatus 10b and reproduces the voice from the speaker 251 or other voice reproduction device. Also, the local control apparatus 10a similarly sends voice data, collected by the microphone 252 of the device 20 worn by the local user, to the guest control apparatus 10b and causes the voice to be reproduced from a voice reproduction device on the side of the guest control apparatus 10b. This allows the local user and the guest user to speak by voice. It should be noted that, in the case where the local control apparatus 10a reproduces the guest user's voice from a stereo headphone or a multichannel speaker worn by the local user, the voice of each channel may be controlled such that the voice can be heard from the direction in which the guest character is present in the virtual space.

Further, the local control apparatus 10a may acquire, from the guest control apparatus 10b, information regarding the guest user's hand motion detected by the device 20 worn by the guest user and move the guest character on the basis of that information. Such action control can be realized in a manner similar to action control over the user character C in response to the local user action described earlier. In particular, in the first action mode, the guest character also moves in a manner linked to the guest user's hand motion. For this reason, the local user can communicate by including body and hand gestures while at the same time viewing, on the display apparatus 30, the manner in which the guest character performs the similar gesture to that of the guest user. It should be noted that the local user's hand motion may also be similarly sent to the guest control apparatus 10b for processing on the side of the guest control apparatus 10b.

Also, the local control apparatus 10a may perform voice communication (voice chat) alone with the guest user without causing the guest character to appear in the virtual space. In this case, the local user can use the device 20 as if it were a telephone. Specifically, in the case where the local user performs a gesture operation of bringing the device 20 close to his or her ear, the local control apparatus 10a guesses that the user wishes to engage in voice communication with other user and initiates voice communication process. The local control apparatus 10a can identify such a gesture operation through a position tracking process handled by the device position identification section 41. Alternatively, the local control apparatus 10a may detect that the device 20 is brought close to the user's face on the basis of a detection result of a proximity sensor incorporated in the device 20. The proximity sensor in this case may be one of the finger sensors that detect the positions of the respective fingers or other sensor.

In the case where a voice communication process is initiated in response to the above gesture operation, and if the communicating party has already been identified, the local control apparatus 10a can immediately initiate voice communication. Alternatively, the local control apparatus 10a may cause the local user to select a guest user as a communicating party by displaying a friend list in the virtual space in response to a gesture operation and send a request to initiate voice communication to the guest control apparatus 10b used by the selected guest user.

Figure 8:
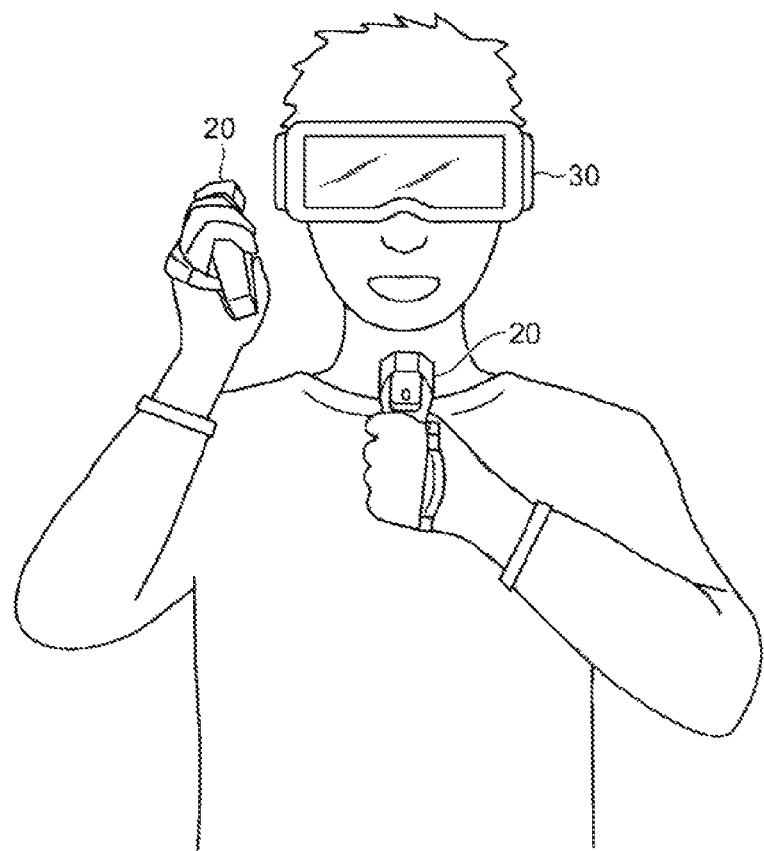
FIG. 8 is a diagram illustrating an example of a case in which the device controlled by the control apparatus according to the embodiment of the present invention for voice communication.

Also, in the case where the local user is wearing the device 20 on each of his or her hands, the local control apparatus 10a may realize a voice communication process by using these devices 20 on both hands. At this time, the local user uses the speaker 251 of one of the devices 20 to hear the voice of the guest user and the microphone 252 of the other of the devices 20 to send his or her own voice to the guest user. FIG. 8 illustrates the manner in which the local user thus engages in voice communication using the two devices 20.

In this example, the local control apparatus 10a may determine, in accordance with the position of each of the devices 20, the voice signal acquired from the microphone 252 of which one of the devices 20 will be sent to the guest control apparatus 10b. Specifically, the voice signal acquired from the microphone 252 of the device 20 that has been identified as being located farther from the user's ear as a result of position tracking is sent to the guest control apparatus 10b. Also, the voice signal received from the guest control apparatus 10b is reproduced from the speaker 251 of the device 20 that has been identified as being located closer to the user's ear. In the example illustrated in FIG. 8, the speaker 251 of the device 20 worn on the right hand of the local user and the microphone 252 of the device 20 worn on the left hand are used for voice communication. This allows the user to engage in voice communication using the speaker 251 and the microphone 252 located at positions suitable for communication without bothering to specify which speaker 251 and which microphone 252 to use. Further, in this case, the local control apparatus 10a may perform control such that the speaker 251 and the microphone 252 that have not been selected are not activated. In the example illustrated in FIG. 8, the microphone 252 of the device 20 on the right hand and the speaker 251 of the device 20 on the left hand are controlled not to be activated. In particular, in the case where the two devices 20 come to positions closer to each other than a fixed distance, it is possible to prevent howling by deactivating the microphone 252 built into one of the devices 20.

It should be noted that embodiments of the present invention are not limited to that described above. For example, although, in the description given above, the device position identification section 41 tracked the position of the device 20 by capturing images of light emitted from the light-emitting element included in the device 20 with the cameras 32 included in the display apparatus 30, embodiments of the present invention are not limited thereto. Position tracking may be performed using cameras provided at different locations. Alternatively, position tracking may be performed by using devices other than cameras. Also, in the case where the device 20 incorporates motion sensors such as acceleration sensor and gyroscope, detection results thereof may be used for position tracking. Also, although, in the above description, the display apparatus 30 was a head-mounted device, embodiments of the present invention are not limited thereto, and the display apparatus 30 may be a stationary device such as home TV receiver.

Also, actions performed by a character in a virtual space are not limited to those described above, and various actions are possible. Similarly, the user's instruction actions that cause the character to perform given actions in the second action mode are not limited to those described above, and various actions are possible.

REFERENCE SIGNS LIST

10 Control apparatus
11 Control section
12 Storage section
13 Communication section
20 Device
30 Display apparatus
31 Video display element
32 Cameras
41 Device position identification section
42 Finger position identification section
43 Virtual space control section
43a Setup retention section
43b Decision section
43c Character control section
43d Image drawing section
210 Device main body
211 Grip section
212 Operation section
220 Fixture
221 Left side surface
222 Right side surface
231 Thumb sensor section
232 Button operation section
233 First finger sensor
234 Rocking button
235 Display section
240 Battery
241 Second finger sensor
242 Third finger sensor
251 Speaker
252 Microphone
253 Haptic device

The invention claimed is:

1. A control apparatus that is connected to a device for detecting a user's hand motion and controls a motion of a virtual character, the control apparatus comprising:
a decision section adapted to decide, in accordance with a detection result of the user's hand motion by the device, whether the detected user's hand motion is a first instruction action that achieves a match between a hand motion of the character and the user's hand motion or a second instruction action that instructs an action different from the user's hand motion; and
a character control section adapted to achieve a match between the character's hand motion and the detected user's hand motion when it is decided, as a result of decision, that the detected user's hand motion is the first instruction action and adapted to cause the character to perform, on the basis of the detected user's hand motion, an action different from the hand motion when it is decided that the detected user's hand motion is the second instruction action.

2. The control apparatus of claim 1, further comprising:
a setup retention section adapted to retain a setting that, for each detail of the user's hand motion, associates the detail of the user's hand motion and a detail of action to be performed by the character, wherein
the decision section refers to the detection result of the user's hand motion and the setting retained and decides whether the detected user's hand motion is the first instruction action or the second instruction action, and
the character control section causes the character to perform the action to be performed by the character included in the setting retained when it is decided, as a result of the decision, that the user's hand motion is the second instruction action.

3. The control apparatus of claim 1, wherein
the device further includes:
a button to be pushed in response to a user's action of clenching his or her fist; and
a force sense presentation section adapted to present a force sense that resists the pushing in of the button; and
in a case where the character performs an action of grasping a target in a virtual space and when an amount of pushing in of the button becomes equivalent to a size of the target, the character control section instructs the force sense presentation section to present a force sense that resists the pushing in of the button.

4. The control apparatus of claim 1, wherein
the device further has a speaker and a microphone, the control apparatus further comprising:
a device position identification section adapted to identify a position of the device in a real space; and a voice communication section adapted to send voice information input from the microphone via an information communication network and perform a voice communication process that sounds the speaker on the basis of the voice information received via the information communication network in a case where the device position identification section decides that the device is close to the user's ear.

5. The control apparatus of claim 4, connected to a plurality of the devices, wherein
the device position identification section identifies a position of each of the plurality of the devices, and
when detecting an approach of the plurality of the devices, the voice communication section performs control to interrupt signal input from the microphone of one of the devices.

6. A device control method for controlling a motion of a virtual character using a device for detecting a user's hand motion, the device control method comprising:
deciding, in accordance with a detection result of the user's hand motion by the device, whether the detected user's hand motion is a first instruction action that achieves a match between a hand motion of the character and the user's hand motion or a second instruction action that instructs an action different from the user's hand motion; and
achieving a match between the character's hand motion and the detected user's hand motion when it is decided, as a result of the decision, that the detected user's hand motion is the first instruction action and causing the character to perform, on the basis of the detected user's hand motion, an action different from the hand motion when it is decided that the detected user's hand motion is the second instruction action.

7. A non-transitory, computer readable storage medium containing a computer program for controlling a motion of a virtual character using a device for detecting a user's hand motion, the program, when executed by a computer, causes the computer to carry out actions, comprising:
deciding, in accordance with a detection result of the user's hand motion by the device, whether the detected user's hand motion is a first instruction action that achieves a match between a hand motion of the character and the user's hand motion or a second instruction action that instructs an action different from the user's hand motion; and
achieving a match between the character's hand motion and the detected user's hand motion when it is decided, as a result of the decision, that the detected user's hand motion is the first instruction action and causing the character to perform, on the basis of the detected user's hand motion, an action different from the hand motion when it is decided that the detected user's hand motion is the second instruction action.

* * * * *